United States Patent [19]
Kanamori et al.

[11] Patent Number: 5,232,409
[45] Date of Patent: Aug. 3, 1993

[54] POWER TRANSMISSION V-BELT

[75] Inventors: Shoji Kanamori, Akashi; Koichi Nakagawa, Nishinomiya; Eiichi Takami, Kobe, all of Japan

[73] Assignee: Mitsuboshi Belting Ltd., Kobe, Japan

[21] Appl. No.: 763,218

[22] Filed: Sep. 20, 1991

[30] Foreign Application Priority Data

Sep. 21, 1990 [JP] Japan .................. 2-99143[U]

[51] Int. Cl.$^5$ ............................... F16G 5/00
[52] U.S. Cl. ........................... 474/260; 474/268
[58] Field of Search ................... 474/260-265, 474/268-271

[56] References Cited

U.S. PATENT DOCUMENTS

| | | | |
|---|---|---|---|
| 3,090,716 | 5/1963 | Stevens | 474/260 |
| 4,096,764 | 6/1978 | Richmond et al. | 474/265 X |
| 4,522,869 | 6/1985 | Anderson, Jr. et al. | 474/260 X |
| 4,778,437 | 10/1988 | Wach et al. | 474/260 |

*Primary Examiner*—Thuy M. Bui
*Attorney, Agent, or Firm*—Wood, Phillips, Van Santen, Hoffman & Ertel

[57] ABSTRACT

A power transmission belt having a tension section and a compression section, with at least a portion of one of the tension and compression sections being formed from rubber of a first color. A rubber coated canvas covers at least a part of at least one of the tension and compression sections including the portion of the one of the tension and compression sections having the first color. The rubber in the rubber coated canvas has a second color that is different than the first color. A rubber layer having a third color is interposed between the portion of the one of the tension and compression sections and the rubber coated canvas. The third color is substantially the same as the second color.

18 Claims, 1 Drawing Sheet

POWER TRANSMISSION V-BELT

BACKGROUND OF THE INVENTION

1. Field of the Invention

This invention relates to power transmission belts and, more particularly, to a power transmission belt with a light-colored, exposed, outer surface in which color bleeding, that might occur during the vulcanization process and deteriorate the appearance of the outer surface, is prevented. The invention also contemplates a method of forming such a belt.

2. Background Art

It is common to construct power transmission belts with rubber having carbon black as one of its components for purposes of increasing belt durability. The result of this is that most power transmission belts are black in color. In some environments, as for purposes of aesthetics, it may be desirable to have belts that are other than black in color. For example, belts used in the home, such as those on sewing machines, washing machines, etc., may be more desirably matched in color to the appliance on which they are used. This often requires the use of white and other light-colored belts.

Heretofore, belt designers have generally compromised either the performance of the light-colored belts or the appearance thereof. The competing objectives of appearance and performance are affected by different characteristics of the light- and black-colored rubber. The dark-colored rubber, with carbon black, exhibits excellent durability. On the other hand, light-colored rubber, while aesthetically pleasing, does not contain carbon black and is resultingly less durable than the rubber with carbon black. Consequently, designers of power transmission belts must arrive at a balance between aesthetics and performance.

The problem of arriving at this balance is aggravated by the conventional belt manufacturing process. That is, the belt components are normally put in place and subjected to high temperatures and pressures during vulcanization. The black rubber, laden with carbon black on the inside of the belt, tends to bleed out into the light-colored rubber during vulcanization and thereby deteriorates the appearance thereof. Typically, an outer cover canvas is impregnated with the light-colored rubber. The black rubber readily migrates through the canvas between the fibers thereof to be visible externally of the belt.

One solution to the above problem is to either thicken the impregnating of light-colored rubber on the canvas or to make the entire belt from light-colored rubber. In either event, an abundance of light-colored rubber tends to diminish belt performance.

SUMMARY OF THE INVENTION

The present invention is specifically directed to overcoming the above-enumerated problems in a novel and simple manner. The principal objective of the present invention is to provide a highly durable power transmission belt, such as a V-belt, while allowing a light color to be chosen for the externally visible part of the belt, without color deterioration, as by outward bleeding of dark-colored rubber from inside of the belt during vulcanization.

More particularly, the invention contemplates a power transmission belt having a tension section and a compression section, with at least a portion of one of the tension and compression sections being formed from rubber of a first color. A rubber coated canvas covers at least a part of at least one of the tension and compression sections including the portion of the one of the tension and compression sections having the first color. The rubber in the rubber coated canvas has a second color that is different than the first color. A rubber layer having a third color is interposed between the portion of the one of the tension and compression sections and the rubber coated canvas. The third color is substantially the same as the second color.

According to the invention, the major part of the tension and compression sections can be made from rubber having carbon black therein, which rubber is highly durable. The rubber layer acts as a barrier to prevent bleeding of the first/black color through the rubber coated canvas where it might be visible externally of the belt. The color bleeding, occurring during the vulcanization process, can be limited to the bleeding of the second color into the rubber with the third color. Since the second and third colors are substantially the same, the appearance of the belt remains unaffected by this bleeding. At the same time, the integrity of light-colored belts can be maintained through the use of carbon black in the belt components. With the inventive structure, it is possible to make the second and third colors white, yellow, blue, pale vermilion, sky blue, and the like, without any color deterioration resulting through the manufacturing process.

To effectively prevent color bleeding, it is preferred that the rubber layer have a thickness of between 0.2 and 0.8 mm, with a Mooney viscosity of 40–50 degrees.

In one form of the invention, there are tensile cords between the tension and compression sections of the belt and formed of one of polyester, aliphatic polyamide and aromatic polyamide.

In one form of the invention, at least one of the tension and compression sections and rubber in the rubber coated canvas is made at least partially from at least one of NR, SBR, and CR.

In one form of the invention, the rubber coated canvas is made from warp and weft yarns that are at least one of cotton, nylon and polyester.

The invention contemplates that the rubber layer and rubber coated canvas completely surround the rubber tension and compression sections formed of rubber of the first color, which is preferably black.

The invention can be practiced with all types of belts and is particularly adaptable to a V-belt.

The invention further contemplates a method of forming a power transmission belt including the steps of: providing a belt body having rubber tension and compression sections with longitudinally extending load-carrying cords between the tension and compression sections; the rubber in the tension and compression sections having a first color; providing a cover canvas; impregnating the cover canvas with a rubber of a second color that is different than the first color by friction and coating the rubber impregnated cover canvas with a rubber layer having a third color that is substantially the same as the second color and having a thickness of 0.2–0.8 mm; placing the rubber impregnated cover canvas and the rubber layer around the tension and compression sections; and vulcanizing the rubber in the rubber tension and compression sections with the rubber impregnated cover canvas and the rubber layer placed around the tension and compression sections.

Preferably, the second and third colors are substantially the same.

DETAILED DESCRIPTION OF THE DRAWINGS

Figure 1:
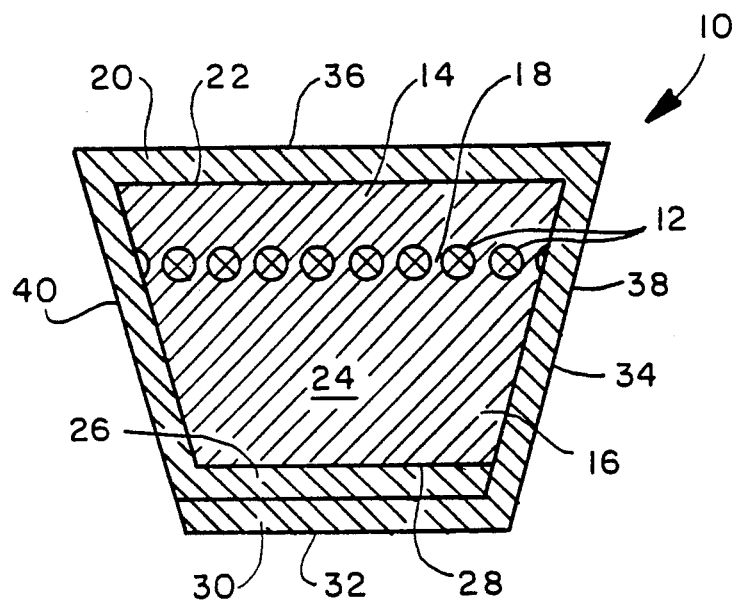
FIG. 1 is a cross-sectional view of a prior art V-belt.

A conventional V-belt, of the type over which the present invention improves, is shown at 10 in FIG. 1. The V-belt 10 has a plurality of longitudinally extending load-carrying cords 12 which define the neutral axis of the belt 10. A rubber tension section 14 is defined outside of the load-carrying cords 12. A rubber compression section 16 is defined inside of the load-carrying cords 12. The conventional V-belt 10 typically uses rubber laden with carbon black in the tension and compression sections 14, 16 and in the layer 18 in which the load-carrying cords 12 are embedded. While the carbon black effectively reinforces the rubber, it causes the rubber to have a dark, black color.

The belt 10 has a light-colored rubber coated cover canvas 20 that is adhered to the peripheral surface 22 of the belt body 24 defined by the rubber tension section 14, rubber compression section 16, and load-carrying cords 12. One portion 26 of the canvas 20 is adhered to the inside surface 28 of the belt body 24, while a separate canvas portion 30 is doubled back under the canvas portion 26 to define an exposed inside face 32 of the belt 10.

Frictioning is effected by three roll calenders operating with a middle roll surface speed of 3:2 for the outer pair rolls, and then rubber impregnated the canvas.

With the conventional belt 10, carbon black from the belt body 24 typically readily bleeds through the canvas 20 to the external surface 34 of the canvas 20, to be visible from externally of the belt. The problem is particularly prevalent at the outside face 36 and laterally spaced side faces 38, 40 of the belt body 24, where the canvas 20 is laminated over the belt body 24 in a single layer.

Figure 2:
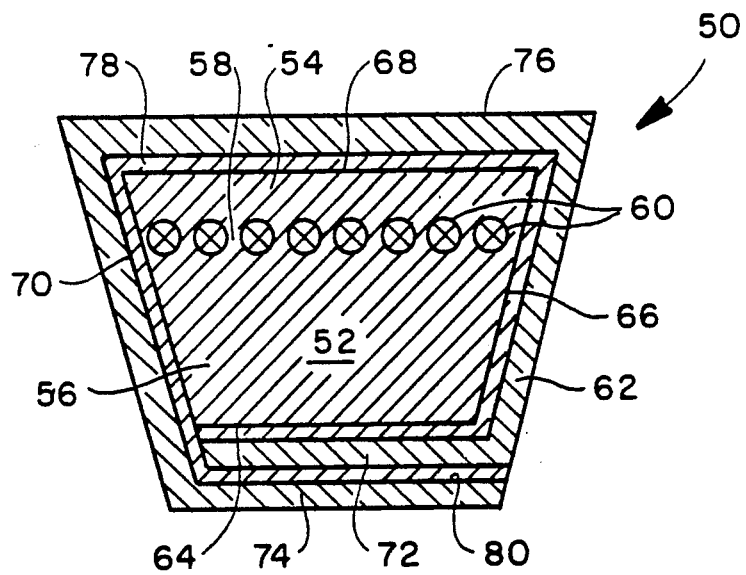
FIG. 2 is a cross-sectional view of a V-belt according to the present invention.

A V-belt, according to the present invention, is shown at 50 in FIG. 2 and has a belt body 52 consisting of a rubber tension section 54, a rubber compression section 56 and a rubber layer 58 in which longitudinally extending, load-carrying cords 60 are embedded.

The belt 50 is wrapped by a rubber coated canvas layer 62, which is laminated to the belt body inside face 64, side face 66, outside face 68, side face 70 and doubled back on itself to effectively define two layers 72, 74, at the inside of the belt 50. The rubber impregnating increases the coefficient of friction of the canvas layer 62. Any number of canvas layers 62, i.e. more than one, is contemplated by the invention.

The load-carrying cords 60 are normally formed of low elongation, high strength material, such as polyester, aliphatic polyamide, aromatic polyamide, etc. The rubber in the tension and compression sections 14, 16, respectively, is preferably formed of one of NR, SBR, CR, etc., or a mixture thereof. The rubber coated canvas layer 62 is defined by woven warp and weft yarns made from cotton, a blend of cotton and nylon, or polyester yarns.

According to the invention, the belt body 52 is made from rubber having carbon black therein so that it has a first color that is normally black. The canvas layer 62 is impregnated with rubber of a second color that is desired for the external, peripheral surface 76 of the belt 50. The second color is preferably one of white, yellow, blue, pale vermillion, sky blue, etc.

According to the invention, a rubber layer 78 is interposed between the belt body 52 and canvas layer 62 to prevent bleeding of the dark color from the belt body 52 into and through the rubber coated canvas layer 62. Preferably, the rubber layer 78 has a third color that is substantially the same as the second color, i.e. it is a light-colored rubber. The second and third colors need not be identical, but are preferably close enough so as not to be noticeably contrasting. The rubber layer 78 is wrapped around the belt body 52 in substantially the same fashion as the canvas layer 62. That is, it extends around and is adhered to the periphery of the belt body 52 and doubled back on itself to provide a portion 80 between the canvas layers 72, 74.

To effectively prevent bleeding of the first color rubber of the belt body 52 through the canvas layer 62, during the vulcanization process, it is preferred that the rubber layer 78 have a thickness of between 0.2 to 0.8 mm, with a Mooney viscosity of 40–50 degrees. If the thickness of the rubber layer 78 is less than 0.2 mm, there is a tendency of the first/black color from the belt body 52 to bleed through the rubber layer 78 and canvas layer 62 during the high temperature, high pressure vulcanization process, to deteriorate the external appearance of the belt 50. If the thickness of the rubber layer 78 is greater than 0.8 mm, this bleeding is virtually eliminated, but the belt thickness is increased to the point that the performance of the belt may be compromised. Either the belt becomes dimensionally oversized or the size of the belt body with carbon black is diminished sufficiently that the integrity of the belt is compromised.

The invention also contemplates a method of forming a power transmission belt, such as a V-belt. The rubber impregnated canvas layer 62 can be coated on one side with light colored rubber, having a thickness of 0.2 to 0.8 mm. Equipment to evenly apply the rubber is well known to those skilled in the art. The canvas 62, with the rubber layer 78 coated thereon, can then be wrapped around and adhered to the belt body 52 prior to vulcanization.

The following experiments demonstrate the effectiveness of the present invention in eliminating detrimental color bleeding without compromising the integrity of the belt.

Inventive Test Sample #1

A belt body 52, as described in FIG. 2, was covered with a cotton canvas impregnated with white rubber having a Mooney viscosity of 45 degrees. One side of the rubber coated canvas 62 was coated with white rubber having 0.3 mm of thickness. The rubber coated canvas, with the rubber layer 78 thereon, was wrapped around the belt body 52 as in FIG. 2 and vulcanized.

While the canvas 62 need be impregnated on only one side to effectively prevent contamination by rubber powder developed during use, the invention contemplates that the canvas 62 could be impregnated with rubber on both sides.

Comparison Test Sample #2 — Conventional

The belt body 24, as seen in FIG. 1, was wrapped by a rubber impregnated canvas layer 20. The rubber coating was a white color. The rubber layer 78 of Test Sample #1 was omitted. The belt of FIG. 1 was then vulcanized to complete the belt formation.

Results

The external appearance and durability of the above test belts are shown in the following table.

TABLE 1

| Belt sample | External Appearance (Bleeding) | Feeding Life Ratio |
|---|---|---|
| Inventive belt Test Sample #1 | No bleeding | 95 |
| Conventional belt Test Sample #2 | bleeding present | 100 |
| Belt such as in FIG. 2 with belt body rubber and rubber in cover canvas the same light color | bleeding of light color | 40 |

As can be seen from the results, the inventive V-belt exhibited excellent durability while maintaining its fine, light-colored external appearance.

The foregoing disclosure of specific embodiments is intended to be illustrative of the broad concepts comprehended by the invention.

We claim:

1. A power transmission belt comprising:
   a tension section;
   a compression section,
   at least a portion of one of the tension and compression sections being formed from rubber of a first color;
   a rubber coated canvas covering at least a part of at least one of the tension and compression sections including the portion of the one of the tension and compression sections having said first color,
   the rubber in the rubber coated canvas having a second color that is different than the first color; and
   rubber layer means having a third color and interposed between the portion of the one of the tension and compression sections and the rubber coated canvas for preventing bleeding of the first color on the portion of the one of the tension and compression sections into the rubber having the second color in the rubber coated canvas,
   wherein the second and third colors are substantially the same.

2. The power transmission belt according to claim 1 wherein the second and third colors are lighter than the first color.

3. The power transmission belt according to claim 1 wherein the rubber layer means has a thickness of between 0.2 and 0.8 mm.

4. The power transmission belt according to claim 1 wherein the portion of the one of the tension and compression sections has carbon black therein so that the first color is substantially black.

5. The power transmission belt according to claim 1 wherein the rubber layer means has a Mooney viscosity of 40-50 degrees.

6. The power transmission belt according to claim 1 wherein there are tensile cords between the tension and compression sections formed of one of polyester, aliphatic polyamide, and aromatic polyamide.

7. The power transmission belt according to claim 1 wherein at least one of the tension and compression sections and rubber in the rubber coated canvas is made at least partially from at least one of NR, SBR, and CR.

8. The power transmission belt according to claim 1 wherein the rubber coated canvas is made from warp and weft yarns that are at least one of cotton, nylon, and polyester.

9. A power transmission belt comprising:
   a rubber tension section;
   a rubber compression section;
   longitudinally extending load-carrying cords between the tension and compression sections;
   a rubber coated canvas for surrounding the tension and compression sections; and
   rubber layer means surrounding the tension and compression sections and interposed between and tension and compression sections and the rubber coated canvas,
   said rubber tension and compression sections being formed from a rubber having a first color,
   the rubber in the rubber coated canvas and the rubber layer means having second and third colors respectively with the second and third colors being substantially the same.

10. The power transmission belt according to claim 9 wherein the power transmission belt is a V-belt.

11. The power transmission belt according to claim 9 wherein the second and third colors are lighter than the first color.

12. The power transmission belt according to claim 9 wherein the rubber layer means has a thickness of between 0.2 and 0.8 mm.

13. The power transmission belt according to claim 9 wherein the rubber in the tension and compression sections contains carbon black so that the first color is substantially black.

14. The power transmission belt according to claim 9 wherein the rubber layer means has a Mooney viscosity of 40-50 degrees.

15. The power transmission belt according to claim 9 wherein the rubber in the tension and compression sections and rubber coated canvas is at least one of NR, SBR, and CR.

16. The power transmission belt according to claim 9 wherein the rubber coated canvas is made from warp and weft yarns that are at least one of cotton, nylon, and polyester.

17. The power transmission belt according to claim 9 wherein the second and third colors are one of white, yellow, blue, pale vermilion and sky blue.

18. A method of forming a power transmission belt comprising the steps:
   providing a belt body having rubber tension and compression sections with longitudinally extending load-carrying cords between the tension and compression sections, the rubber in the tension and compression sections having a first color;
   providing a cover canvas;
   impregnating the cover canvas with rubber of a second color that is different than the first color by frictioning and coating the rubber impregnated cover canvas with a rubber layer having a third color that is substantially the same as the second color and having a thickness of 0.2-0.8 mm;
   placing the rubber impregnated cover canvas and the rubber layer around the tension and compression sections; and
   vulcanizing the rubber in the rubber tension and compression sections with the rubber impregnated cover canvas and the rubber layer placed around the tension and compression sections.

* * * * *